United States Patent [19]

Pulse

[11] 4,084,690
[45] Apr. 18, 1978

[54] VIDEO DISC PACKAGE HAVING A CENTER POST

[75] Inventor: Carl Frederick Pulse, Greenwood, Ind.

[73] Assignee: RCA Corporation, New York, N.Y.

[21] Appl. No.: 790,861

[22] Filed: Apr. 26, 1977

[30] Foreign Application Priority Data

Aug. 9, 1976 United Kingdom ............... 33098/76

[51] Int. Cl.² ............................................ B65D 85/30
[52] U.S. Cl. ...................................... 206/310; 206/1.5; 206/303; 206/397; 206/405; 206/493; 220/324; 206/444
[58] Field of Search ................ 220/324; 206/303, 309, 206/310, 311, 312, 313, 397, 405, 406, 413, 414, 444, 1.5, 472, 474, 485, 488, 493, 415, 387

[56] References Cited

U.S. PATENT DOCUMENTS

| | | | |
|---|---|---|---|
| 3,109,539 | 11/1963 | Turoff | 206/310 |
| 3,540,578 | 11/1970 | Jones | 220/324 |
| 3,576,340 | 4/1971 | Jones | 220/324 |
| 3,638,788 | 2/1972 | Solomon | 206/387 |
| 3,700,098 | 10/1972 | Posso | 206/406 |
| 3,737,067 | 6/1973 | Palson | 206/387 |
| 3,747,745 | 7/1973 | Esashi | 206/387 |
| 3,825,112 | 7/1974 | Schumaker et al. | 206/310 |
| 3,863,762 | 2/1975 | Arai | 206/405 |
| 3,949,872 | 4/1976 | Paudras | 206/310 |
| 3,980,178 | 9/1976 | Schidlowski | 206/313 |

FOREIGN PATENT DOCUMENTS

427,141 4/1935 United Kingdom ................. 206/310

Primary Examiner—William Price
Assistant Examiner—Bruce H. Bernstein
Attorney, Agent, or Firm—Eugene M. Whitacre; William H. Meagher; Dilip A. Kulkarni

[57] ABSTRACT

A video disc package comprises a base member and a cover member hingedly secured to the base member. The members define a cavity for enclosing a centrally-apertured disc record when juxtaposed. A center post includes first and second portions attached respectively to the base and the cover members. Each of the portions has arcuate peripheral surfaces dimensioned for engagement with diametrically opposite portions of the wall defining the central aperture of the record when it is enclosed in the cavity. The first and the second portions are constructed such that they nest within the central aperture during the reception of the record in the cavity.

5 Claims, 4 Drawing Figures

VIDEO DISC PACKAGE HAVING A CENTER POST

This invention relates generally to a video disc system, and more particularly, to a video disc package.

BACKGROUND OF THE INVENTION

The U.S. patent application of James Hillier, Ser. No. 597,371, filed on July 18, 1975, now U.S. Pat. No. 4,030,138, (as well as a counterpart British Patent Application No. 28054/76, filed July 6, 1976), discloses a disc record handling system. As disclosed in the aforementioned Hillier application, which is also assigned to the assignee of the instant application, a pair of finger holes are provided in the unrecorded label area of a video disc. The package used for shipping and storing the video disc is provided with a well for receiving the video disc. The spacing between the edge of the well and the outer periphery of the video disc is such that the outer periphery of the video disc is not directly accessible, thereby constraining the consumer to handling the video disc by the finger holes. The package is provided with a finger cavity located underneath the finger holes to facilitate grasping of the video disc for removal from the package. Reference may be made to the Canadian Design Patent No. 40,524 for an illustration of a preferred design of such finger holes for handling video discs.

In the aforementioned type systems, when the consumer opens the package for removal of the video disc, the video disc may rest either in the base of the package, or the cover of the package, depending upon how the package is opened. For example, if the package is in a base-on-the-top position, the video disc may find itself in the cover when the package is opened. In either case, it is desirable to keep the video disc from falling out of the package.

SUMMARY OF THE INVENTION

Pursuant to the present invention, a video disc package comprises a base member and a cover member hingedly secured to the base member, the members defining a cavity for enclosing a centrally apertured disc record when juxtaposed. A center post includes first and second portions secured respectively to the base and the cover members. Each of the portions has arcuate peripheral surfaces dimensioned for engagement with diametrically opposite portions of the wall defining the central aperture of the record when it is contained in the cavity. The construction of the two portions is such that they nest within the central aperture while the record is received in the cavity.

DETAILED DESCRIPTION OF THE PREFERRED EMBODIMENT

Figure 1:
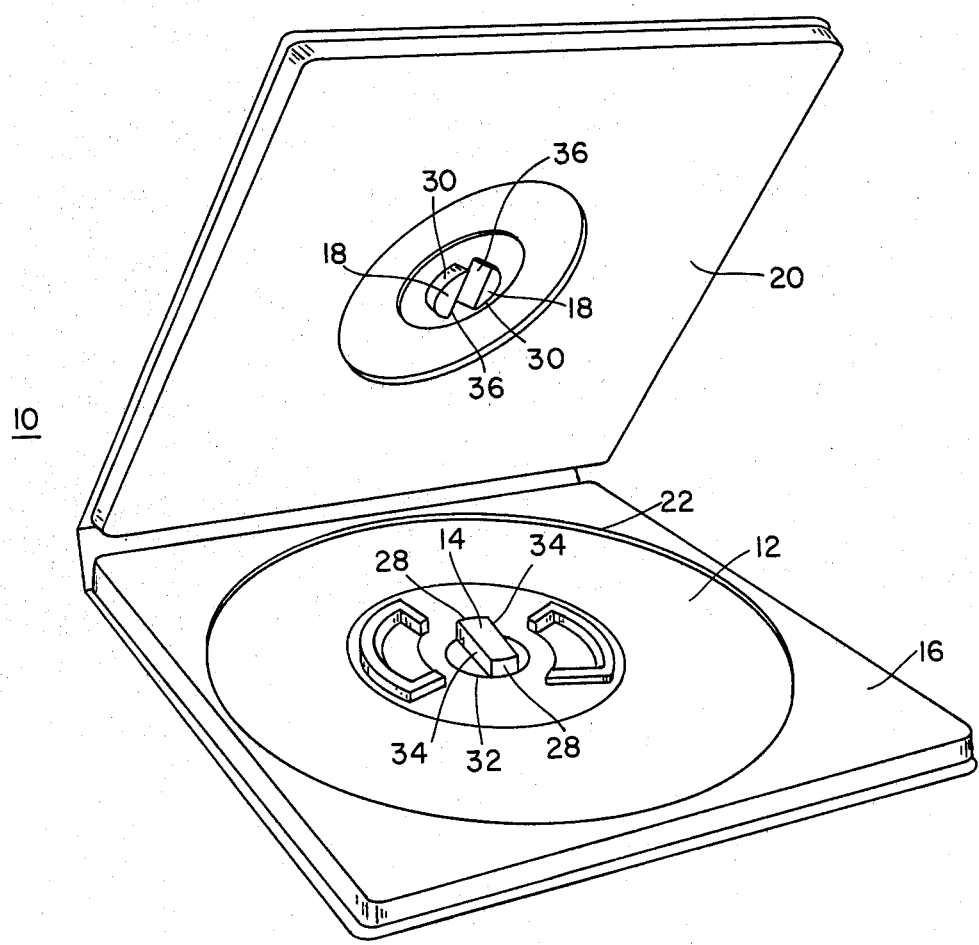
FIG. 1 illustrates a video disc package having a center post pursuant to the present invention.

As shown in FIG. 1, a video disc package 10 is provided with a split center post for securing and centering a video disc 12 in the package. The split center post comprises a portion 14 secured to a base 16 of the package 10 and portions 18 secured to a cover 20 of the package.

Figure 2:
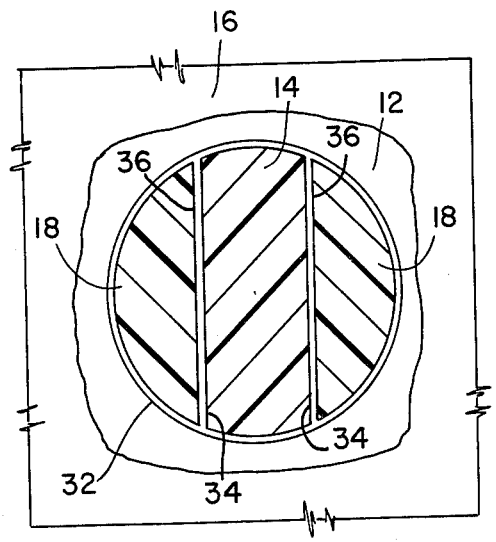
FIG. 2 shows a cross-sectional view of the center post when the FIG. 1 package, occupied by a centrally apertured disc record, is in a shut condition.

When the package 10 is shut after placing the video disc 12 in a well 22 provided in the base 16 of the package, the portions 14 and 18 interlock as shown in FIG. 2. When the portions 14 and 18 are interlocked, the arcuate peripheral surfaces 28 and 30 of the portions engage a center hole 32 of the video disc 12 in order to secure and center the video disc in the package 10, and the straight surfaces 34 and 36 of the portions engage each other to provide a friction closure for the package.

Figure 3:
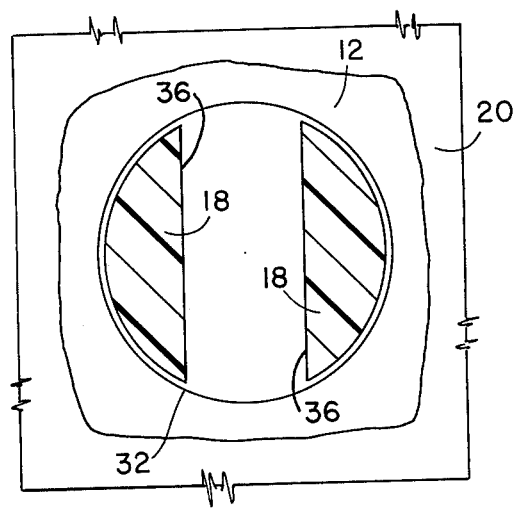
FIG. 3 depicts a cross-sectional view of the center post while the record is resting in the cover member of the package of FIG. 1.
Figure 4:
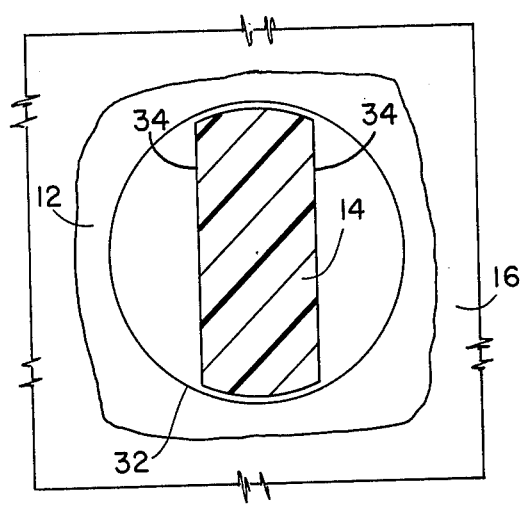
FIG. 4 illustrates a cross-sectional view of the center post during the containment of the record in the base member of the package of FIG. 1.

If the video disc 12 is resting in the cover 20 of the package 10 after it is opened, the portions 18 serve to secure and center the video disc in the package as shown in FIG. 3. In a similar manner, if the video disc 12 is resting in the base 16 of the package 10 after it is opened, the portion 14 serves to secure and center the video disc in the package as shown in FIG. 4. Thus, the video disc 12 remains secured and centered in the package 10 regardless of which half of the package is first opened.

Additionally, the interlocking arrangement of the split center post prevents skewing of the package while it remains shut, and also provides a friction closure for the package when shut.

What is claimed is:

1. A package comprising:
 (A) a first member;
 (B) a second member;
 said first member and said second member defining a cavity for enclosing a centrally apertured disc record when said members are juxtaposed; and
 (C) a split center post including:
   (a) a first portion attached to said first member; said first portion having arcuate peripheral surfaces dimensioned for engagement with diametrically opposite portions of the wall defining said central aperture of said disc record when said disc record is enclosed in said cavity; and
   (b) a second portion attached to said second member; said second portion also having arcuate peripheral surfaces dimensioned for engagement with diametrically opposite portions of said wall defining said central aperture of said disc record when said disc record is enclosed in said cavity;
 the construction of said first portion and said second portion being such that said first and second portions interlock and nest within said central aperture of said disc record when said disc record is enclosed within said cavity.

2. A package as defined in claim 1 wherein said nesting of said first and second portions additionally serves as a friction closure device for said package during said juxtaposition of said members.

3. A package as defined in claim 1 wherein said second portion comprises a pair of elements defining a slot; said first portion comprises a rib-like element which is admitted in said slot when said members are juxtaposed.

4. A package comprising:
 (A) a first member;
 (B) a second member;

said first member and said second member defining a cavity when said members are juxaposed; and (C) a split center post including:
  (a) a first portion attached to said first member and having arcuate peripheral surfaces; and
  (b) a second portion attached to said second member and also having arcuate peripheral surfaces;
the construction of said first portion and said second portion being such that said first and second portions interlock and each of said surfaces defines a part of the periphery of a circle formed when said members are juxtaposed.

5. A package comprising:
(A) a first member;
(B) a second member;
said first member and said second member defining a cavity for enclosing a centrally apertured disc record when said members are juxtaposed; and
(C) a split center post including:
  (a) a first portion attached to said first member; said first portion having arcuate peripheral surfaces dimensioned for engagement with opposite portions of the wall defining said central aperture of said disc record when said disc record is enclosed in said cavity; and
  (b) a second portion attached to said second member; said second portion also having arcuate peripheral surfaces dimensioned for engagement with opposite portions of said wall defining said central aperture of said disc record when said disc record is enclosed in said cavity;
the construction of said first portion and said second portion being such that said first and second portions interlock and nest within said central aperture of said disc record when said disc record is enclosed within said cavity and such that peripheral surfaces of one of said portions are available for record aperture wall engagement when said members are not juxtaposed.

* * * * *